G. A. SCHEEFFER.
ELECTRIC METER.
APPLICATION FILED JAN. 2, 1904.

950,079.

Patented Feb. 22, 1910.

3 SHEETS—SHEET 2.

Witnesses.
J. Ellis Glenn.
Benjamin B. Hull.

Inventor.
Gustave A. Scheeffer.
By Albert S. Davis
Atty.

G. A. SCHEEFFER.
ELECTRIC METER.
APPLICATION FILED JAN. 2, 1904.
950,079.
Patented Feb. 22, 1910.
3 SHEETS—SHEET 3.
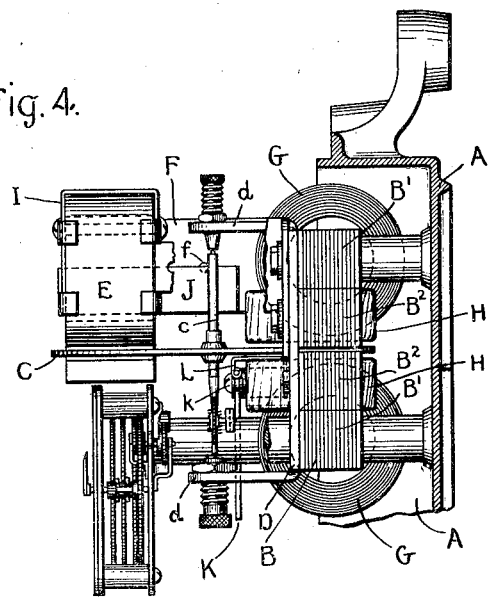
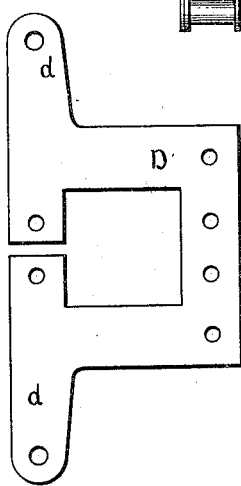
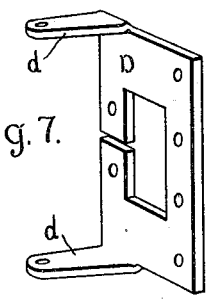
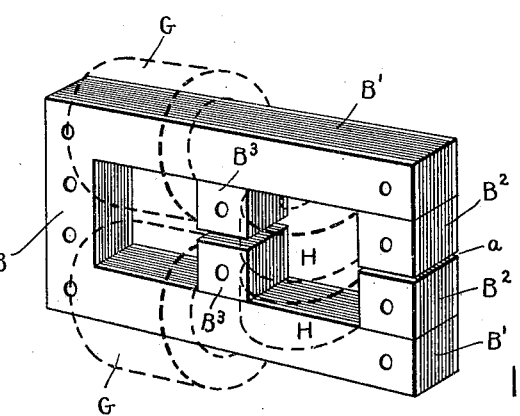
Witnesses.
J. Ellis Glenn
Benjamin B. Hull
Inventor.
Gustave A. Scheeffer.
By Albert S. Davis
Atty.

UNITED STATES PATENT OFFICE.

GUSTAVE A. SCHEEFFER, OF FORT WAYNE, INDIANA, ASSIGNOR TO GENERAL ELECTRIC COMPANY, A CORPORATION OF NEW YORK.

ELECTRIC METER.

950,079. Specification of Letters Patent. Patented Feb. 22, 1910.

Continuation of abandoned application Serial No. 123,050, filed September 12, 1902. This application filed January 2, 1904. Serial No. 187,437.

*To all whom it may concern:*

Be it known that I, GUSTAVE A. SCHEEFFER, a citizen of the United States, residing at Fort Wayne, county of Allen, State of Indiana, have invented certain new and useful Improvements in Electric Meters, of which the following is a specification.

My invention relates to alternating current electric meters of the induction motor type.

The object of my invention is to produce a new and improved meter for measuring alternating electric currents, which shall be simple in construction, cheap to manufacture, light in weight and effective in operation.

A further object of my invention is to produce a meter in which vibration, to which the moving parts may be subject, will produce less injury than in meters as heretofore constructed; and also to produce a meter in which the friction of the moving parts may be wholly compensated for.

My invention will best be understood by reference to the accompanying drawings, in which—

Figure 1:
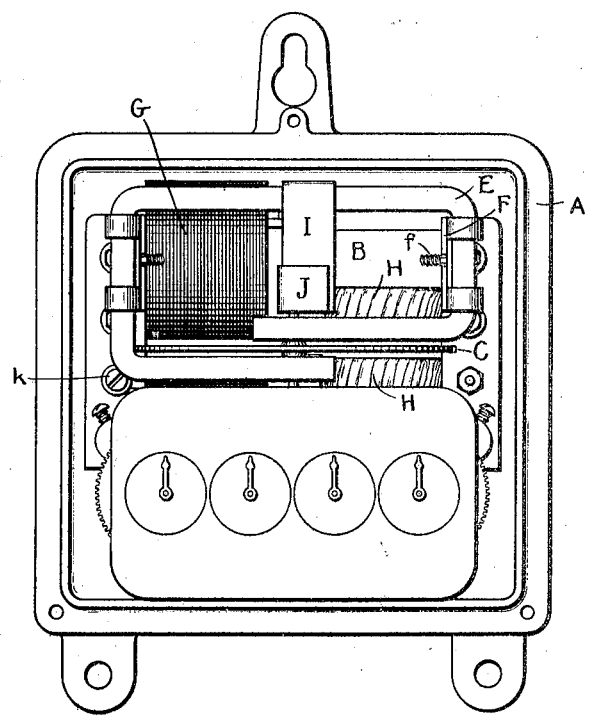
Figure 2:
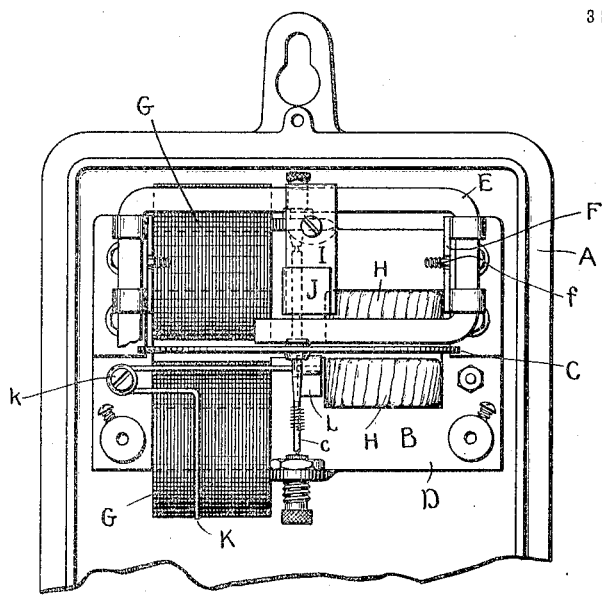
Figure 3:
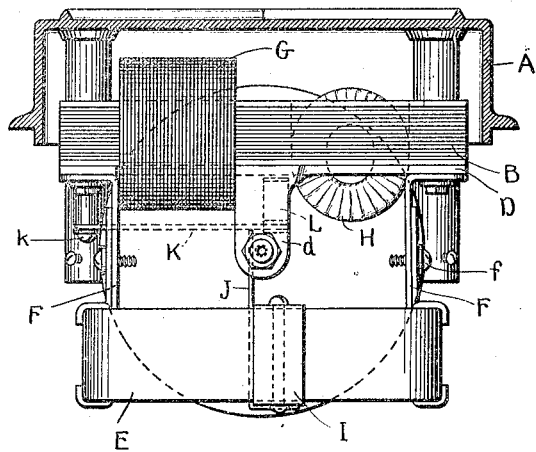
Figure 8:
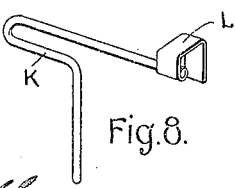

Figure 1 shows a meter constructed in accordance with my invention with the case removed; Fig. 2 shows the same with the indicating dial and its mechanism removed; Fig. 3 is a plan view of the same; Fig. 4 is a side elevation looking from the right of Fig. 1; Fig. 5 shows the core of the primary member with the positions of the coils indicated in dotted lines; Figs. 6 and 7 are detail views of the support for the moving parts; and Fig. 8 is a detail view of my friction compensating device.

The meter comprises a primary member consisting of a core B which, as is usual in the construction of cores of alternating-current apparatus, is built up of iron or soft steel plates suitably clamped together, a closed metallic armature consisting of a disk of copper or aluminum free to rotate in suitable bearings, a registering movement, a damping magnet, and shunt and series windings, the shunt windings being mounted on the core and the series windings in close proximity to the meter armature.

Referring first to Fig. 5 of the drawing, it will be seen that the primary member consists of a rectangular core of magnetic material having an air-gap $a$ at one end thereof and projecting poles intermediate the ends. In the particular construction shown in the drawing, the rectangular core is made up of a ⊏ shaped member $B^1$ with two inwardly-projecting pole-pieces $B^2$ $B^2$ separated by a small air-gap $a$ at the extremities of the limbs of the ⊏ shaped member, and two more projecting pole-pieces $B^3$ $B^3$ which are located intermediate the ends of the limbs. The inner ends of the pole-pieces $B^3$ $B^3$ are separated from each other by an air-gap large enough to permit the armature disk to rotate freely therein, and the pole-pieces $B^2$ $B^2$ are separated by an air-gap large enough to cause the desired intensity of the magnetic flux through the pole-pieces $B^3$ $B^3$ and the armature of the meter.

Two shunt coils G G having a large number of turns of relatively fine wire are mounted one on each limb of the ⊏ shaped core on the side of the pole-pieces $B^3$ $B^3$ away from the air-gap $a$, and the magnetic flux generated by these coils flows in two parallel paths through the two sets of pole-pieces $B^3$ $B^3$ and $B^2$ $B^2$, the meter armature being influenced only by that part of the shunt flux which passes through the air-gap between the pole-pieces $B^3$ $B^3$. Two series coils H H having relatively few turns of large wire, which carries the current to be measured, are located between the two sets of pole-pieces one above and the other below the armature disk. The series coils are preferably two in number, in order to secure a balanced and symmetrical arrangement, and they are located in close proximity to the armature. Except for the purpose of securing a symmetrical arrangement one series coil located either above or below the armature would answer.

With the primary member constructed in accordance with the principles of my present invention, I avoid the use of an impedance coil in series with the shunt winding and obtain a magnetic circuit with small reluctance having only one gap or break in the magnetic circuit of the core and in which only part of the magnetic flux acts on the meter armature. The form of the core is compact, cheap to construct, simple and efficient.

It has been found by experience that the magnetic flux, due to the shunt coil winding in an alternating-current meter, must be very small, in order to reduce to a minimum the vibration of the armature produced by induction from the core so as to avoid the rapid wear of the jewel used in the armature-shaft bearings. The shunt flux must also be small in order to avoid a checking effect on the accuracy of the meter under different conditions; that is, in order that variations of voltage should have little effect on the accuracy of the meter.

In its general construction my meter is exceedingly small and compact. The primary member carrying the shunt and series coils is supported on posts from the back of the meter casing A, and all the working parts of the meter are supported directly from the primary member. The bearings for the shaft c on which the meter armature C is mounted are supported by two integral lugs or extensions d d projecting from a plate D which serves as a clamping plate for securing the laminations of the primary member together. The plate together with its projecting lugs constitutes a frame which is stamped out of sheet-metal in the form shown in Fig. 6, and then the lugs or extensions d d are turned up so that they are substantially at right angles to the body of the frame, as shown in Fig. 7. As the frame with its projecting lugs and the bending of the latter is produced in the stamping press, it will be evident that the frame may be produced rapidly and economically and that all frames will be exact duplicates. With such a construction it is easy to position the armature-shaft bearings with absolute accuracy with respect to the primary member of the meter, and since the frame and projecting lugs are made on one piece, the bearings for the rotating armature-shaft will never change their position, and the shaft will remain permanently in proper and accurate alinement.

The damping magnet E in my meter is arranged to act on the armature disk at a point removed from the shunt and series coils, and this magnet is adjustably supported by means of brackets F secured to the upper part of the primary member, the adjustment being obtained by loosening the screws f and moving the magnet away from or toward the armature-shaft.

If a meter is mounted in such a place that it is subject to jar or vibration, the effect of the jar upon the jeweled thrust-bearing for the vertical armature shaft is injurious. By my invention I provide means for decreasing the vibration of the moving parts.

I is a strip of iron secured to the permanent magnet E. Strip I carries the iron strip J which extends into close proximity to the shaft c of the moving parts, as shown in Fig. 3. Strip J is magnetized by permanent magnet E to which it is magnetically connected by strip I, and thus acts as a damping magnet for the shaft c. The axial vibration of the vertical shaft is thus decreased and the chance of injury to the thrust-bearing is diminished. However light the moving parts of the meter may be and in however good condition the bearings may be, nevertheless there is necessarily some friction which is liable to produce error at starting and on light loads, unless it is compensated for. To effect the compensation for the friction I provide the small piece of iron L carried by the bent wire K, which is clamped to the primary member by the screw k. The iron piece L is placed in close proximity to one of the poles B³ of the primary member and produces a distortion of the field at the pole, which increases the starting torque and thus compensates for friction. By loosening screw k and adjusting the support K so as to bring piece L nearer to, or farther away from, the surface of disk C the compensating effect of piece C may be adjusted.

I do not desire to limit myself to the particular construction and arrangement of parts here shown, since changes therein, which do not depart from the spirit of my invention and which are in the scope of the appended claims, will be obvious to those skilled in the art.

What I claim as new and desire to secure by Letters Patent of the United States, is,—

1. In an electric meter, a rectangular core of magnetic material having an air-gap cutting one of the shorter sides of the rectangle and poles projecting toward each other from points near the centers of the longer sides of the rectangle, a shunt winding surrounding the core and so positioned that the shortest magnetic circuit therefor is through that portion of the rectangle having a closed magnetic circuit and through the projecting poles, and a disk armature projecting between said projecting poles.

2. In an electric meter, a core of magnetic material shaped to constitute an almost completely closed magnetic circuit having only a small air-gap between its adjacent ends, projecting poles extending from said core, a shunt winding so positioned on the core that its shortest magnetic circuit is through a portion of the core having a closed magnetic circuit and through the said projecting poles, a series winding in the space between the projecting poles and the end of the rectangle having the air-gap, and an armature of conducting material projecting between said poles and in inductive relation to said series winding.

3. In an electric meter, a rectangular core of magnetic material having an air-gap at one end thereof and projecting poles intermediate the ends, a shunt winding surrounding the core in the space between the projecting poles and the end of the rectangle having the air-gap, a series winding on that side of the projecting poles adjacent to the air-gap, and a disk armature projecting between the poles and in inductive relation to the series winding.

4. In an electric meter, a rectangular core of magnetic material having an air-gap at one end thereof and projecting poles intermediate the ends, a shunt winding comprising two coils surrounding the two limbs of the rectangular core adjacent to the end having a closed magnetic circuit, a disk armature projecting between the said intermediate poles, and a series winding comprising two coils located one above and one below the said armature in the space between the projecting poles and that end of the rectangular core having the air-gap.

5. In an electric meter, an armature of conducting material, a series winding adjacent thereto, and a shunt winding provided with a ⊏ shaped core of magnetic material having a plurality of sets of inwardly-projecting poles, the magnetic flux of part of said poles acting on said armature.

6. In an electric meter, an armature of conducting material, a series winding comprising two coils one on each side of said armature and in close proximity thereto, and a shunt winding provided with a ⊏ shaped core of magnetic material having a plurality of sets of inwardly-projecting poles, the magnetic flux of part of said poles acting on the said armature.

7. In an electric meter, a movable armature, a vertical shaft therefor, a jeweled thrust-bearing supporting the weight of said armature and shaft, a damping magnet opposing rotation of the armature, and means comprising a magnetic member continuously operative during normal operation of the meter for preventing axial vibration of the shaft.

8. In an electric meter, a movable armature, a vertical shaft therefor of conducting material, a jeweled thrust-bearing supporting the weight of said armature and shaft, and a continuously magnetized member extending into close proximity to said shaft for preventing axial vibration thereof.

9. In an electric meter, a movable armature, a vertical shaft therefor of conducting material, a jeweled thrust-bearing supporting the weight of armature and shaft, a damping magnet opposing rotation of the armature, and a continuous flux damping magnet opposing axial movement of the shaft.

10. In an electric meter, a movable armature, a vertical shaft therefor, a jeweled thrust-bearing supporting the weight of armature and shaft, a damping magnet opposing rotation of the armature, and a strip of magnetic material magnetized by said magnet and extending into close proximity to the shaft of said armature for preventing axial vibration thereof.

In witness whereof, I have hereunto set my hand this 29th day of December, 1903.

GUSTAVE A. SCHEEFFER.

Witnesses:
 JAMES J. WOOD,
 N. N. KING.